United States Patent [19]
Koch

[11] Patent Number: 5,178,575
[45] Date of Patent: Jan. 12, 1993

[54] GAME CALL INCORPORATING TWO FRICTIONAL MATERIALS

[76] Inventor: Clarence E. Koch, 315 Lampert St., Oshkosh, Wis. 54901

[21] Appl. No.: 771,586

[22] Filed: Oct. 4, 1991

[51] Int. Cl.⁵ ............................................. A63H 5/00
[52] U.S. Cl. ................................................. 446/397
[58] Field of Search ............... 446/397, 418; 84/410, 84/403, 402 A, 402 C, 411 P, 420, 414, 422.1, 422.2

[56] References Cited

U.S. PATENT DOCUMENTS

| | | | |
|---|---|---|---|
| 2,338,816 | 1/1944 | Lockhart | 84/411 P |
| 3,595,121 | 7/1971 | Magers | 84/420 X |
| 4,586,912 | 5/1986 | Adams | 446/397 |
| 4,836,822 | 6/1989 | Finley et al. | 446/397 |

Primary Examiner—Mickey Yu
Attorney, Agent, or Firm—B. Noel Kivlin

[57] ABSTRACT

A game call is disclosed that incorporates two frictional striking surfaces of both slate and glass on a common base to simulate sounds of wild game having varying tone, pitch, texture and frequency. The frictional striking surfaces are provided on one or more non-opposite sides of the base. The use of two distinct and different striking surfaces allows the operator to imitate the calls of different game animals with a minimum amount of movement. The operator can easily compare and determine which of the surfaces gives the desired sound under varying temperature, humidity and weather conditions without having to exchange or flip over the caller.

10 Claims, 5 Drawing Sheets

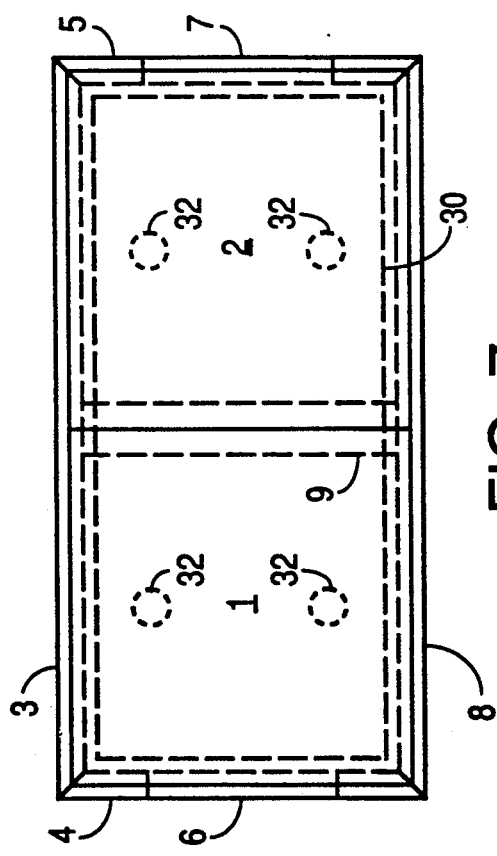
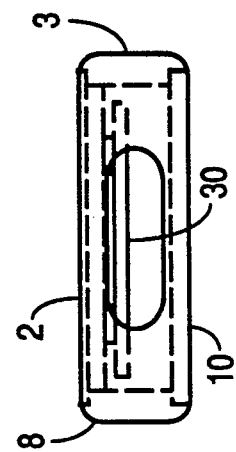
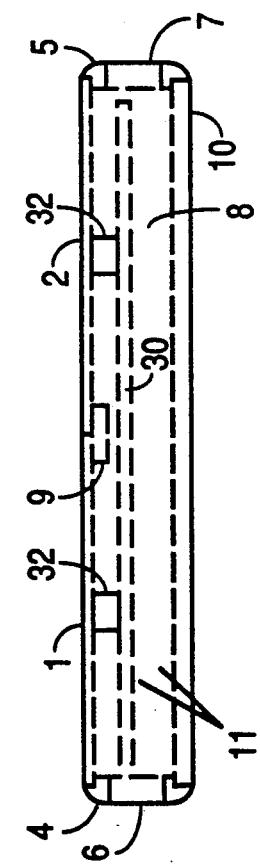
FIG. 7
FIG. 9
FIG. 8

5,178,575

GAME CALL INCORPORATING TWO FRICTIONAL MATERIALS

BACKGROUND OF THE INVENTION

Field of the Invention

This invention relates to wild game calls and more particularly to game calls of the slate and peg and of the glass and peg friction types.

Description of the Relevant Art

Game calls of the slate and peg and of the glass and peg types are well known. They are conventionally made with either a frictional striking surface of slate or a frictional striking surface of glass positioned on one side of the game call. This allows the call operator to imitate game calls by moving a wood or a plexiglass striker across the frictional surface to simulate various game calls.

As is well known to hunters such as wild turkey hunters, it is essential to minimize motion while waiting for an unsuspecting animal to approach. Although the use of game calls is commonly effective in attracting animals, their use typically involves some kind of motion that could be detected by an animal. Thus, to minimize the possibility of alerting the animal to the hunter, it is desirable to provide game calls that require minimal motion.

It is also frequently desirable to imitate the calls of several animals such as a number of wild turkeys calling to each other. Unfortunately in this situation, the hunter must use one game call to imitate one bird, then exchange the game call with another to imitate a different bird. This requires additional motion and causes an excessive time delay between calls.

Still another problem associated with game calls is the variance of performance under changes in temperature, humidity and other weather conditions. A hunter may need to carry several different game calls to anticipate changes in temperature, humidity and other weather conditions, and must compare the sounds created by the various game calls for a given condition. In addition to being tedious, this requirement also increases the amount of movement required by the hunter.

SUMMARY OF THE INVENTION

In accordance with the present invention, a game call is provided that incorporates two frictional striking surfaces of both slate and glass on a common base to simulate sounds of wild game having varying tone, pitch, texture and frequency. The frictional striking surfaces are provided on one or more non-opposite sides of the base. The use of two distinct and different striking surfaces allows the operator to imitate the calls of different game animals with a minimum amount of movement. The operator can easily compare and determine which of the surfaces gives the desired sound under varying temperature, humidity and weather conditions without having to exchange or flip over the caller.

These and other advantages are provided with the present invention, in accordance with which a device for simulating the call of wild game comprises a base, a first frictional striking surface mounted to the base, and a second frictional striking surface mounted to the base such that a backside of the first frictional striking surface does not substantially oppose a backside of the second frictional striking surface. The invention may further include an interface strip mounted between the first and second striking surfaces to simulate a sound delay between the calls of animals.

The invention will be more readily understood by reference to the drawings and the detailed description. As will be appreciated by one skilled in the art, the invention is applicable to game calls in general, and is not limited to the specific embodiment disclosed.

BRIEF DESCRIPTION OF THE DRAWINGS

FIG. 7 is a top plan view of a game call in accordance with a third embodiment of the invention.

FIG. 8 is an end view of the third embodiment.

FIG. 9 is a side elevation view of the third embodiment.

DETAILED DESCRIPTION

The following includes a detailed description of the best presently contemplated mode for carrying out the invention. The description is intended to be merely illustrative of the invention and should not be taken in a limiting sense.

Figure 1:
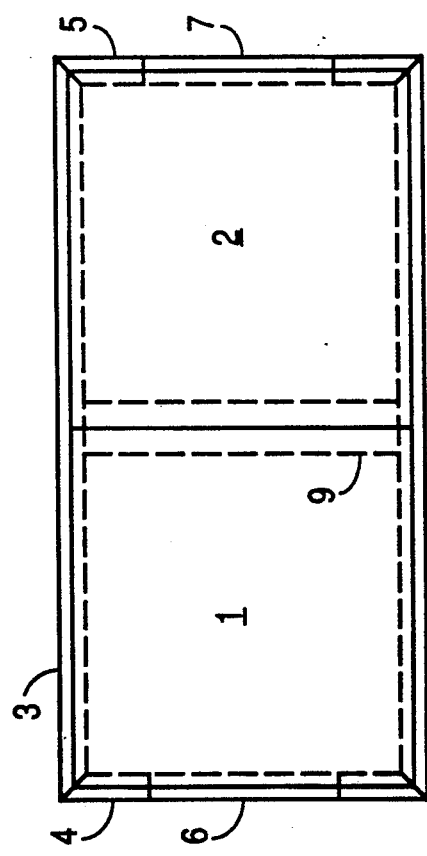
FIG. 1 is a top plan view of a game call having two striking surfaces in accordance with one embodiment of the invention.

Referring to the drawings, FIG. 1 shows a top plan view of a game call in accordance with the present invention. The elements of the game call described below are joined together with glue to form a hollow box structure including an acoustical sound chamber formed between a base portion and a pair of frictional striking surfaces. The frictional striking surfaces include a glass striking surface 1 and a slate striking surface 2. A bonding strip 9 made of glass, plastic or other material physically joins and connects (along with a gluing compound) the two striking surfaces 1 and 2. The dimensions of bonding strip 9 as well as its material and methods of joining are chosen to produce the desired volume, clarity and tone of sound.

A variety of compounds may be used to bond the elements of the game call. For example, Goop available from Eclectic Products, Inc., Carson, Calif. and 100% Silicon Rubber available from Dow Corning, Inc., Midland, Mich. are used within the preferred embodiment.

The base includes two solid side pieces 3 and 8 with recesses to support the striking surfaces 1 and 2. The base further includes an end piece 4 with a recess to support one end of striking surface 1, and an end piece 5 with a recess to support one end of striking surface 2. Sound release and control openings 6 and 7 are provided in end pieces 4 and 5. These openings 6 and 7 are more clearly seen with reference to the following drawings.

Figure 2:
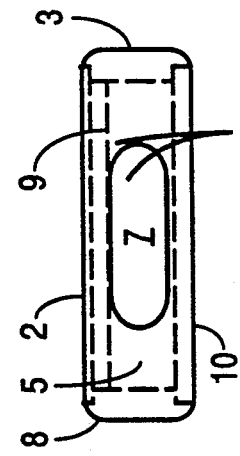
FIG. 2 is an end view of the game call.
Figure 3:
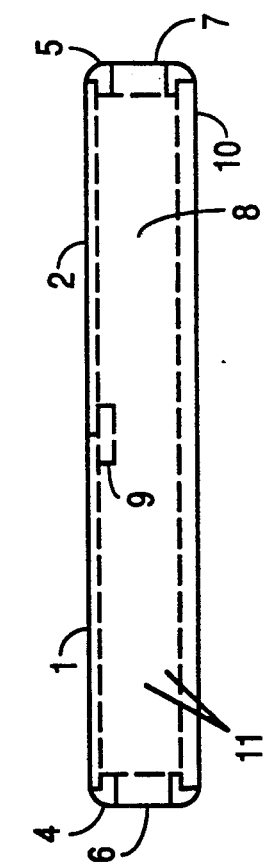
FIG. 3 is a side elevation view of the game call.

FIGS. 2 and 3 show an end view and a side view of the game call with the striking surface 2 supported by side pieces 3 and 4 and a bottom resonant plate 10 joined to side pieces 3 and 8 and to end pieces 4 and 5. It is noted that bottom resonant plate 10 forms together with side pieces 3 and 8 and end pieces 4 and 5 to form an open base to which the glass striking surface 1 and the slate striking surface 2 are supported. An acoustical sound chamber 11 is thereby formed in the interior cavity of the game call. FIG. 3 also illustrates bonding strip 9 which is used to join together striking surfaces 1 and 2.

Figure 4:
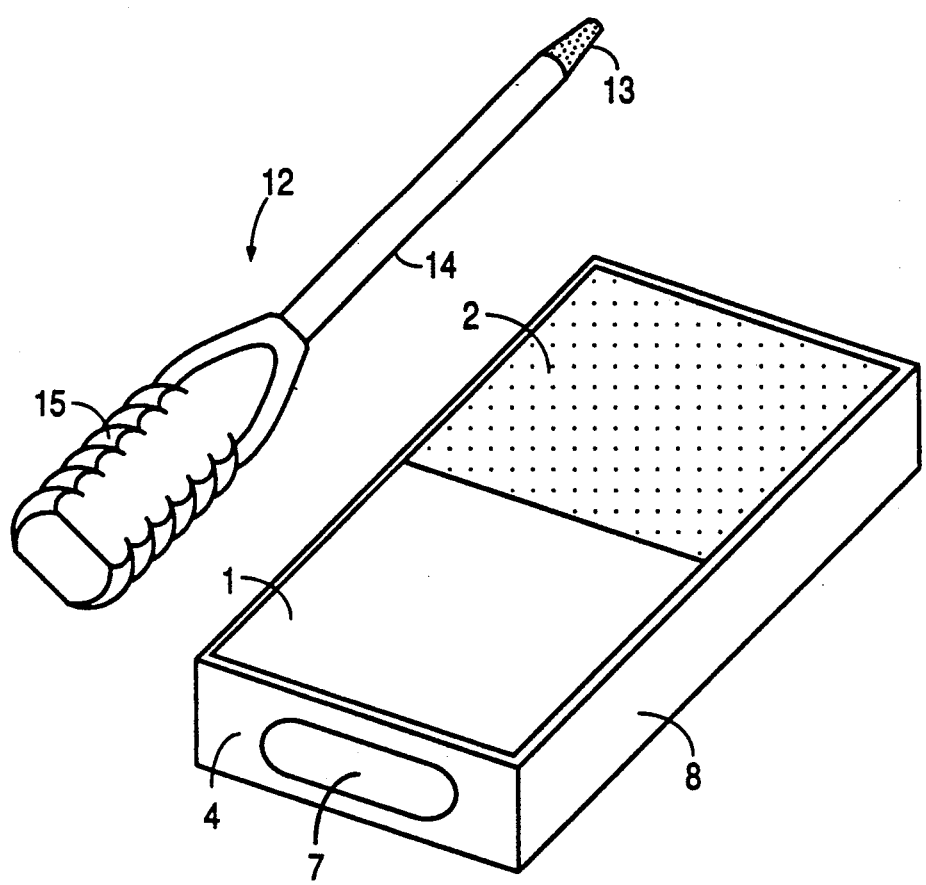
FIG. 4 is a perspective view of the game call and striker in accordance with a preferred present embodiment of the invention.

FIG. 4 shows an isometric view of the game call and a striker 12. The striker 12 includes a handle portion 15 made of wood or other material and a plexiglass or wood rod 14 with a straight or tapered end portion 13 formed at its end.

Figure 5:
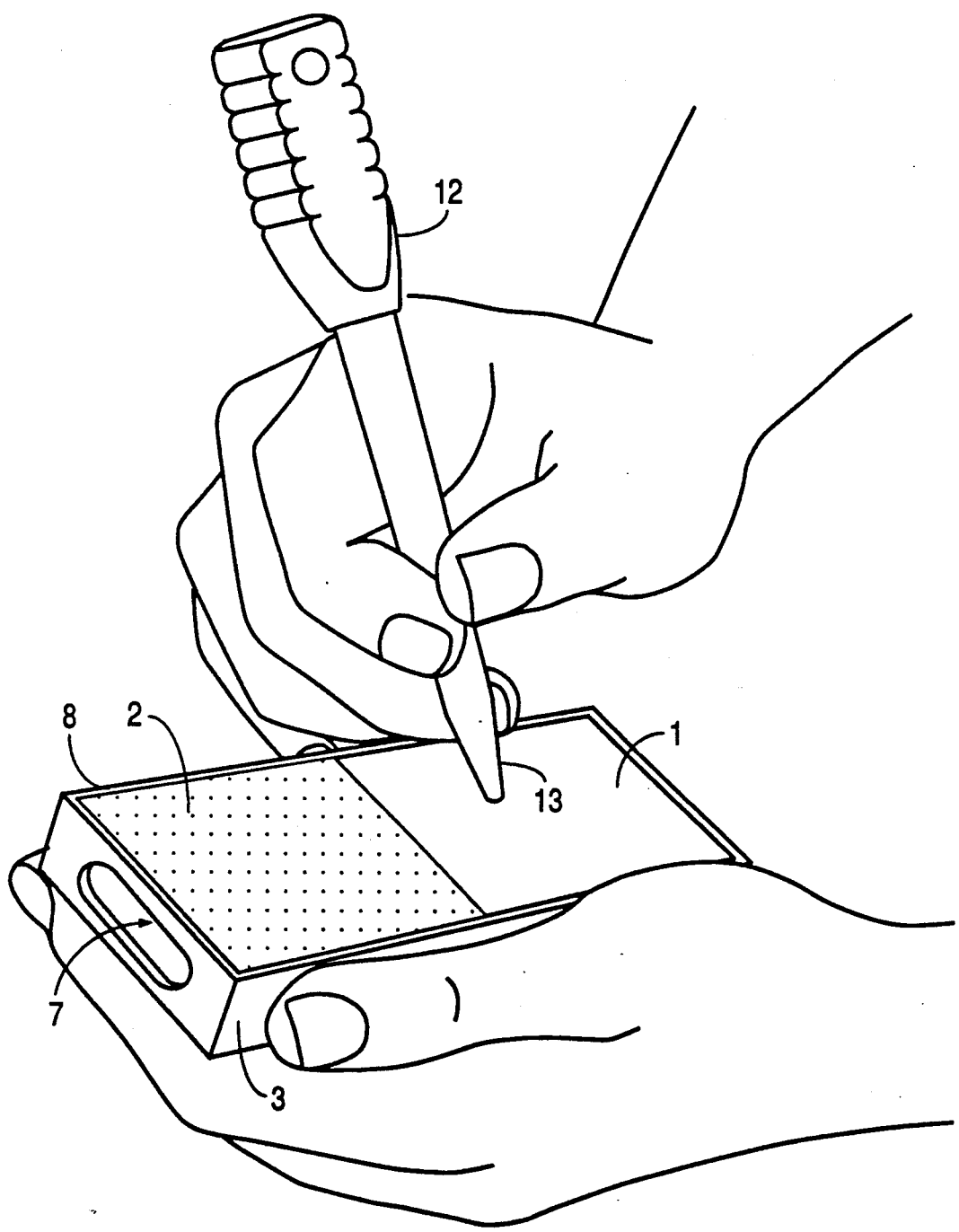
FIG. 5 is a perspective view that illustrates the use of the game call.

Prior to use, the flat striking surfaces of the glass 1 and the slate 2 are sanded and roughened to produce the needed frictional surface. As illustrated in FIG. 5, the device is held in the cupped palm of the hand by pressure applied to the sides 3 and 8 of the device by the thumb on one side and the fingers on the other side. A striker 12 is held in the opposite hand in a manner much as one would hold a pencil. The striker 12 is held at an angle of approximately 15° to the striking surfaces 1 and 2 of the device. Replication of the calls made by wild turkeys are produced by moving the striker end 13 in various configurations on the striking surfaces to reproduce the yelp, cluck, purr, whine, cackle, cutt and various other sounds made by turkeys.

This process of producing sounds may be repeated alternately on either of the striking surfaces to produce similar calls of subtly different pitch and tone. This imitates the sounds of several turkeys with their inherently different voices.

Changes in sound can be produced on this call by varying methods. The alternate use of both striking surfaces as well as varying the position of use on the striking surface can change the tone and pitch of the sound. The degree of pressure used to produce the sound can affect the volume of the calls produced. A striker of a different size or material can also change the sound.

All of these variations can be accomplished with a minimum amount of hand movement as previously unavailable on other calls of the friction and peg type. This feature is of great importance owing to the exceptional eyesight and wariness of the wild turkey.

Figure 6:
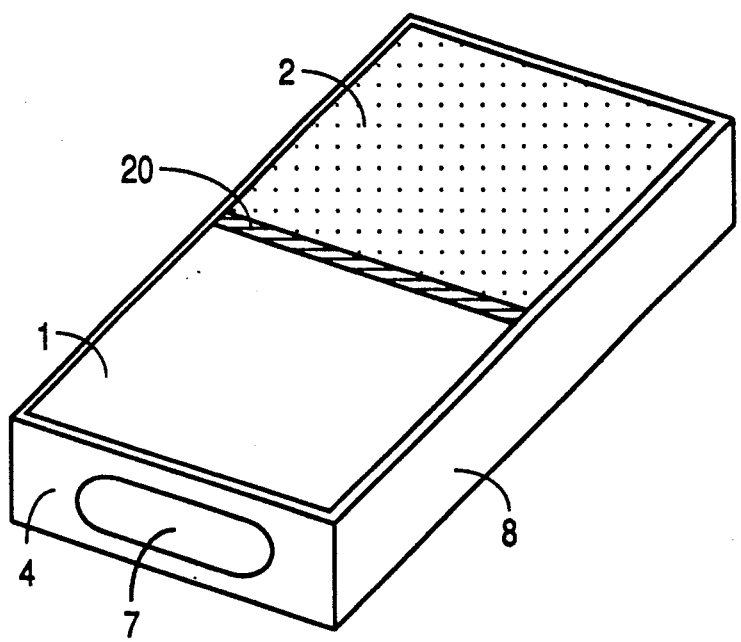
FIG. 6 is a perspective view of a game call having an interface strip in accordance with a second embodiment of the invention.

The game call in accordance with the present invention may further include an interface strip 20 as shown in FIG. 6. The interface strip 20 is made of wood or other material and physically separates the glass striking surface 1 from the slate striking surface 2. When the call operator moves the striker 12 continuously back and forth between the glass striking surface 1 and the slate striking surface 2, a momentary silence is produced as the striker end 13 glides over the interface strip 20. The momentary silence simulates the delay time of one bird responding to another bird's call.

It is noted that the interface strip 20 may be either a separate piece from or an integral part of the bonding strip 9. Furthermore, the interface strip 20 may be composed of a variety of materials.

A further modification of the above described calls is accomplished by providing an additional resonant plate 30 of glass, slate or other material as shown in FIGS. 7-9. The embodiment of FIGS. 7-9 is similar to the first embodiment, and corresponding elements are numbered identically. The additional resonant plate 30 is suspended with a silicon compound 32 below the striking surfaces 1, 2 and above the bottom resonant plate 10.

This modification with its resultant vibratory change improves the sound and volume of some calls, especially the cluck and cutting calls.

Numerous modifications and variations will become apparent to those skilled in the art once the above disclosure is fully appreciated. It is to be understood that the above detailed description of the preferred embodiment is intended to be merely illustrative of the spirit and scope of the invention and should not be taken in a limiting sense. The scope of the claimed invention is better defined with reference to the following claims.

I claim:

1. A friction and peg game call device for simulating the call of wild game comprising:
   a base;
   a first frictional striking surface mounted to said base wherein said first frictional striking surface is glass; and
   a second frictional striking surface mounted to said base such that a backside of said first frictional striking surface does not substantially oppose a backside of said second frictional striking surface and such that a topside of said first frictional striking surface does not substantially oppose a topside of said second frictional striking surface;
   wherein said second frictional striking surface is slate and wherein a hand-held striker can be moved across the topsides of said first and said second frictional surfaces to simulate the sound of wild game.

2. The device for simulating the calls of wild game as recited in claim 1 wherein said first frictional striking surface is mounted adjacent to said second frictional striking surface.

3. The device for simulating the calls of wild game as recited in claim 2 wherein an interface strip is mounted between said first frictional striking surface and said second frictional striking surface such that a surface of said interface strip forms a continuous plane with said first and said second frictional striking surfaces, and wherein said striker moved across said first and said second frictional striking surfaces creates a sound simulating wild game and wherein substantially no sound is created when said striker is moved across said interface strip.

4. The device for simulating the calls of wild game as recited in claim 1 wherein said first frictional striking surface is mounted adjacent to said second frictional striking surface to form a continuous plane.

5. The device for simulating the calls of wild game as recited in claim 1 wherein an acoustical sound chamber is formed between said base and said first and second frictional striking surfaces.

6. The device for simulating the calls of wild game as recited in claim 5 wherein said base includes at least one sound release and control opening.

7. The device for simulating the calls of wild game as recited in claim 1 wherein an acoustical plate is positioned below said first and second frictional striking surfaces and above a bottom surface of said base.

8. A friction and peg game call device for simulating the call of wild game comprising:
   a base;
   a first frictional striking surface mounted to said base wherein said first frictional striking surface is glass;
   a second frictional striking surface mounted to said base such that a backside of said first frictional striking surface does not substantially oppose a backside of said second frictional striking surface and such that a topside of said first frictional striking surface does not substantially oppose a topside of said second frictional striking surface, wherein said second frictional striking surface is slate and wherein a hand-held striker can be moved across the topsides of said first and said second frictional surfaces to simulate the sound of wild game; and a bonding plate fastened to said first and second frictional striking surfaces such that the topsides of said first and second frictional striking surfaces form a substantially continuous plane.

9. The device for simulating the calls of wild game as recited in claim 8 wherein an interface strip is mounted between said first frictional striking surface and said second frictional striking surface such that a surface of said interface strip forms a continuous plane with said first and said second frictional striking surfaces, and wherein said striker moved across said first and said second frictional striking surfaces creates a sound simulating wild game and wherein substantially no sound is created when said striker is moved across said interface strip.

10. The device for simulating the calls of wild game as recited in claim 8 wherein said bonding plate is fastened to the backsides of said first and second frictional striking surfaces.

* * * * *